Oct. 30, 1934.  F. M. CARROLL ET AL  1,978,893
TABULATING MACHINE
Original Filed July 18, 1929   8 Sheets-Sheet 1
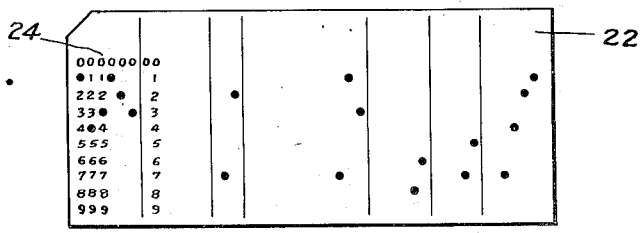
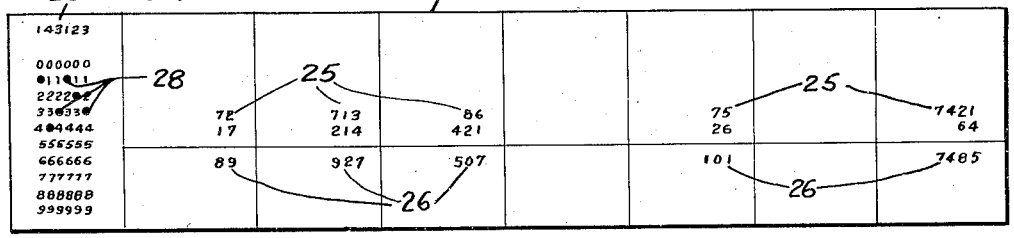
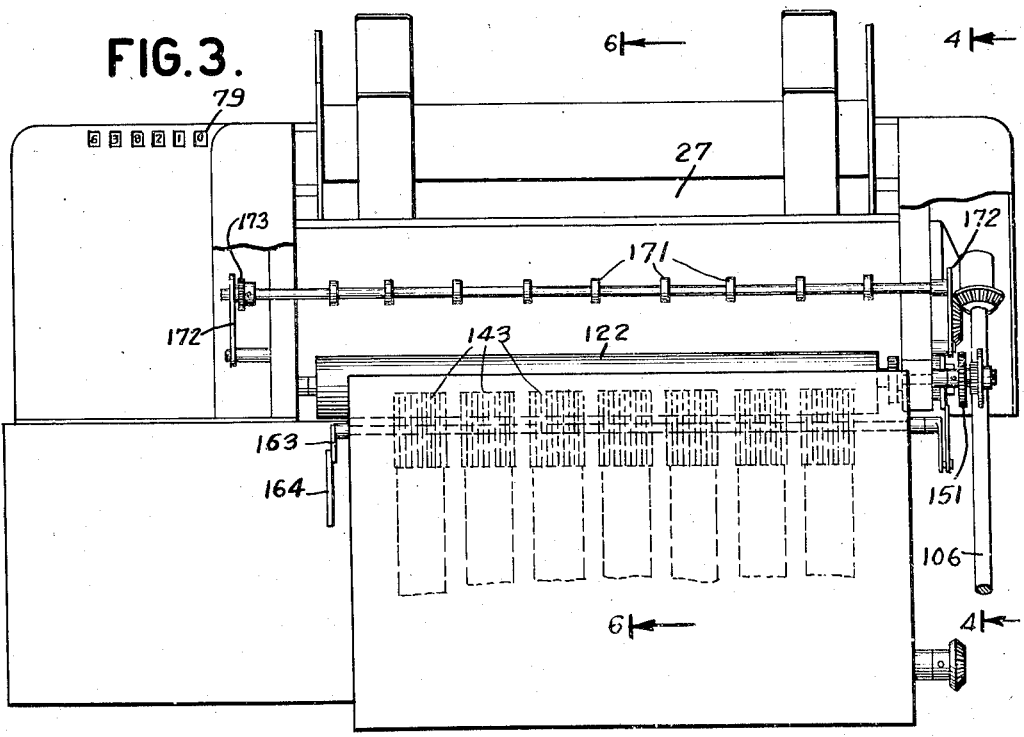
INVENTORS
Fred M. Carroll
John H. Bakelaar
BY
ATTORNEY Oct. 30, 1934.        F. M. CARROLL ET AL        1,978,893
                       TABULATING MACHINE
         Original Filed July 18, 1929    8 Sheets-Sheet 4

Oct. 30, 1934.   F. M. CARROLL ET AL   1,978,893
TABULATING MACHINE
Original Filed July 18, 1929   8 Sheets-Sheet 5
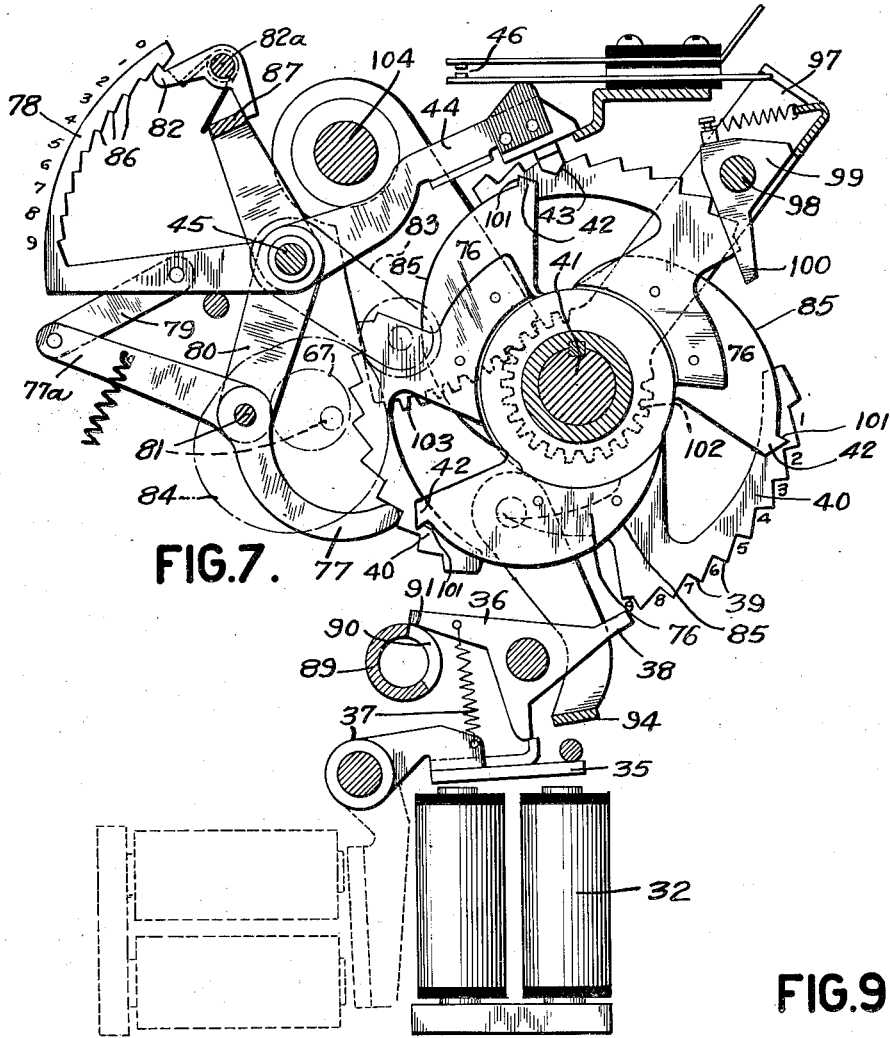
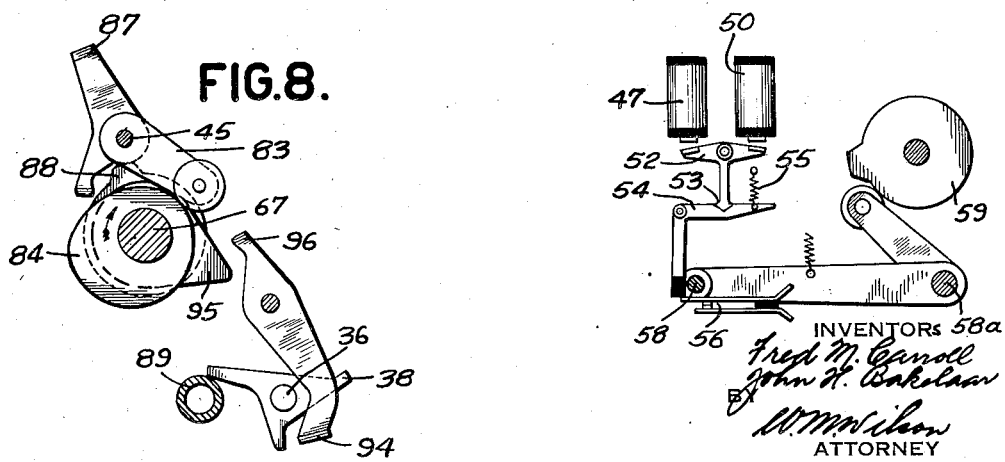

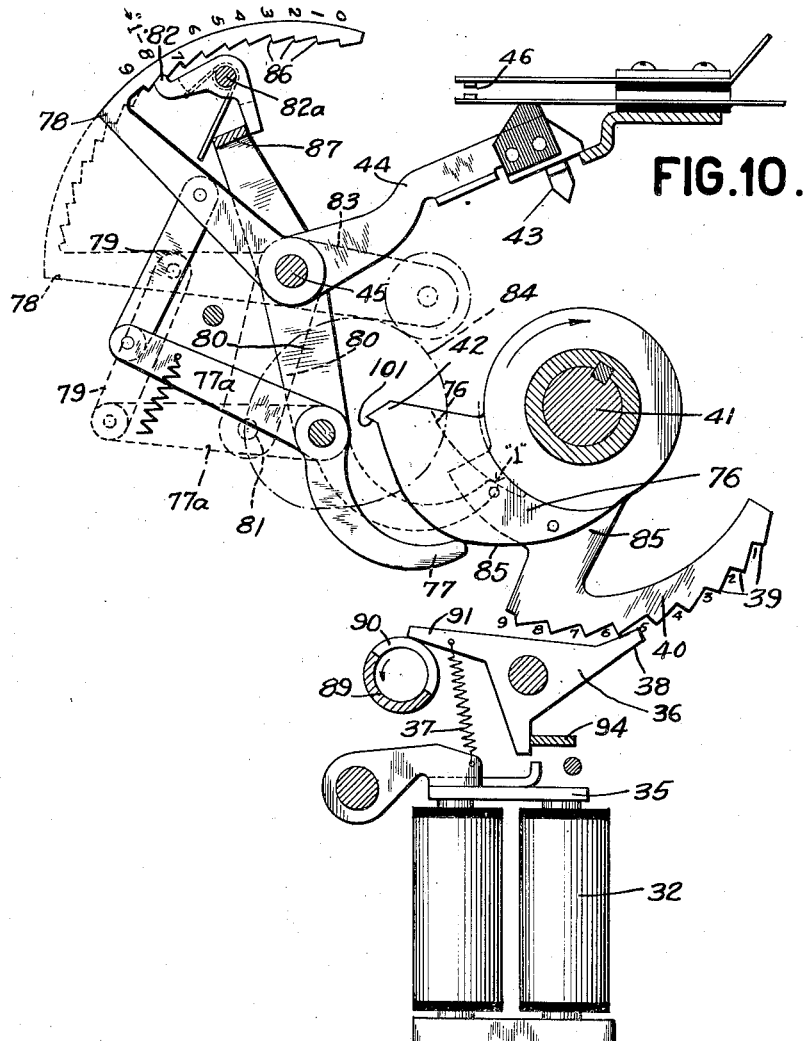
FIG.10.
FIG.11.
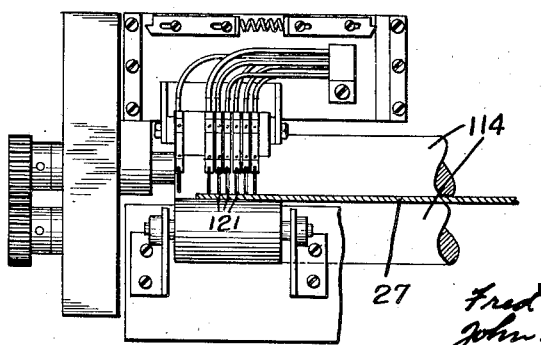

Oct. 30, 1934.  F. M. CARROLL ET AL  1,978,893
TABULATING MACHINE
Original Filed July 18, 1929   8 Sheets-Sheet 7
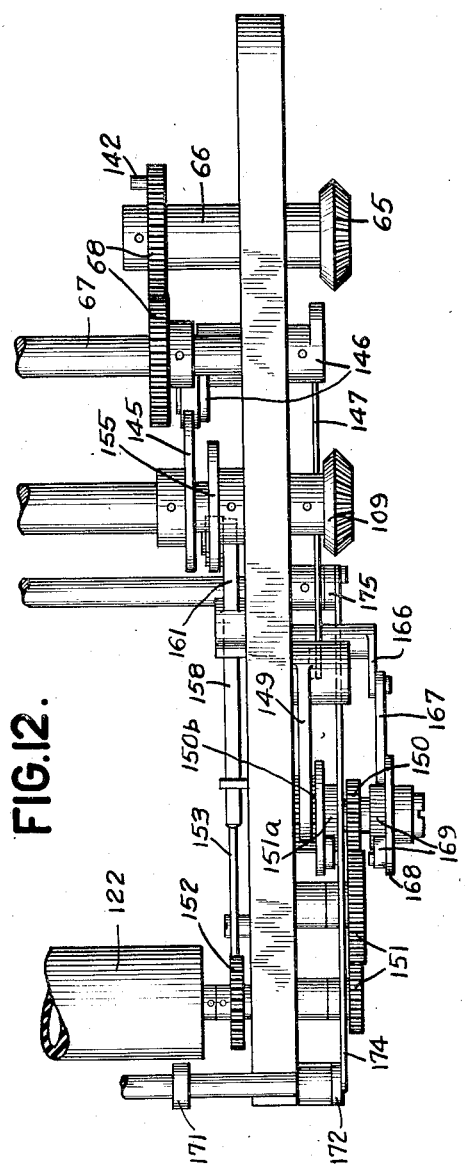
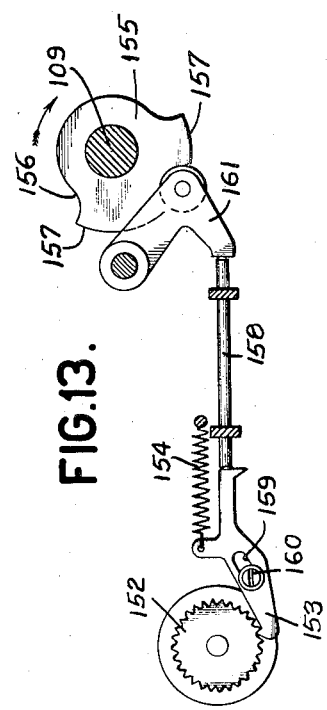
INVENTORS
Fred M. Carroll
John H. Bakelaar
BY
Wm Wilson
ATTORNEY

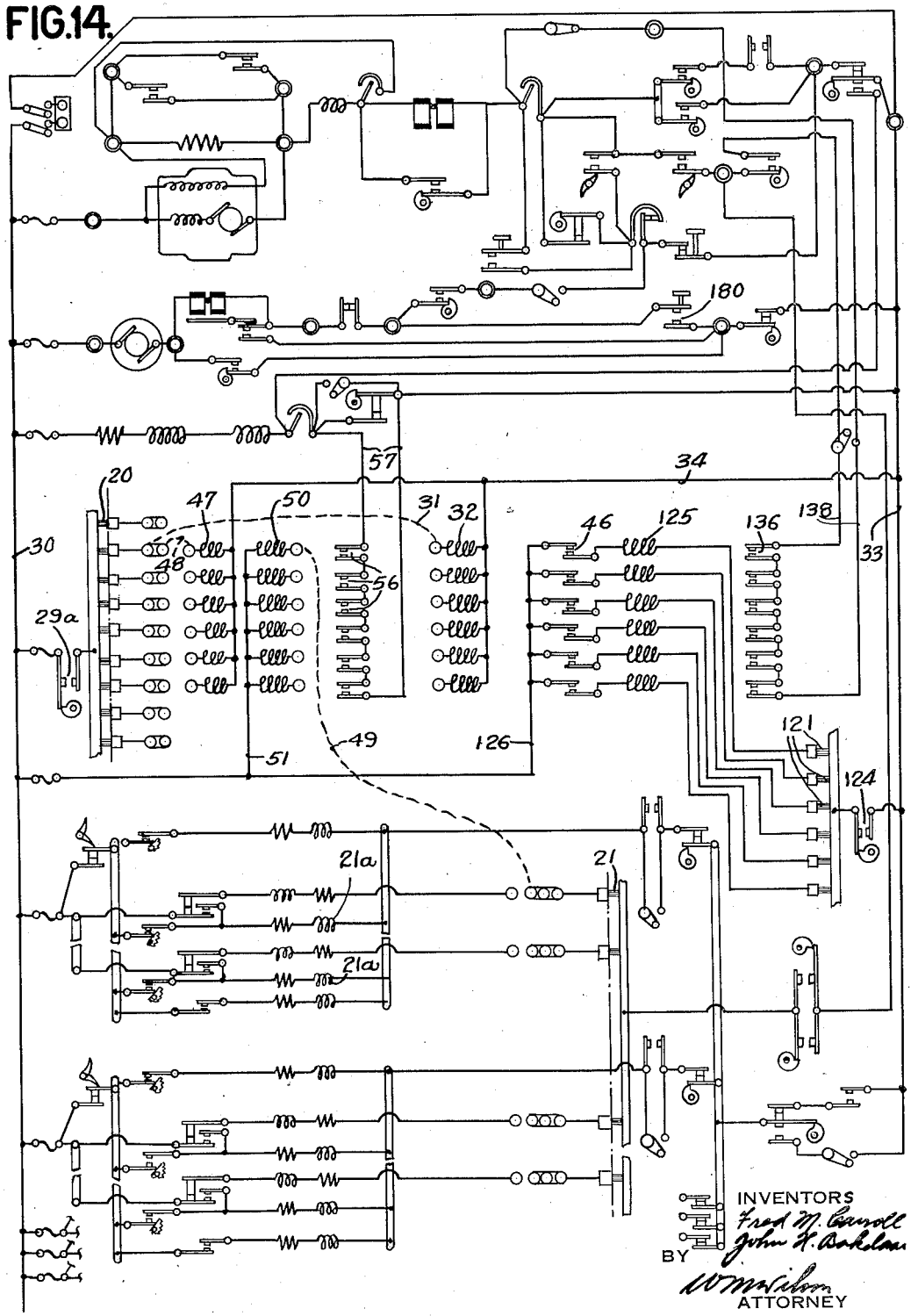

Patented Oct. 30, 1934

1,978,893

UNITED STATES PATENT OFFICE 1,978,893

TABULATING MACHINE

Fred M. Carroll, Yonkers, N. Y., and John H. Bakelaar, Paterson, N. J., assignors, by mesne assignments, to International Business Machines Corporation, New York, N. Y., a corporation of New York Original application July 18, 1929, Serial No. 379,190. Divided and this application November 14, 1932, Serial No. 642,566. In Canada May 19, 1930

19 Claims. (Cl. 101—93)

This invention relates to printing mechanisms for tabulating machines or the like, and is primarily directed to the provision of means for selectively feeding classified record sheets to a printing device for receiving data of the same classification.

This application is a division of the copending application Serial No. 379,190, filed July 18, 1929.

It has heretofore been proposed to feed a card or bill to a printing device to receive a group of items and the totals thereof, such data constituting a statement of a particular person's account. Since it is desirable that such cards be classified in some manner it is essential that only those cards be fed to the printing device whose classifications compare with the classifications of the data entered. Otherwise, it is apparent that without the provision of such a device, entries may be effected upon the wrong records.

It is then a broad object of the present invention to provide for the selective feeding of a card or bill when the classification of the card or bill is identical to the classification of the items entered.

It is a further object of the invention to condition the machine when a discrepancy exists, in such a manner that the operator may be able to discern and rectify the error.

In connection with the above it is a further object to provide an indicating device for visibly indicating the classification of the items entered whereby the operator may observe the classification of the items entered and if necessary compare the same with the classification of the bill selectively fed to receive such items.

In the present instance the item entering means comprises record cards which are successively fed to the usual analyzing mechanism. The classification is represented by perforations and a similar means of classification is provided for classifying the bills. The cards and bills are preferably fed in an inverse relation and it is also an object of the invention to provide for the comparison of the records and bills when fed in this particular manner.

The present invention in its broadest aspects, may not contain the above feature and its adoption, it should be understood, is to meet a particular situation, and with minor changes the comparing mechanism may be adapted to compare cards and bills fed in the same order.

To these and other ends the invention consists in the novel features of construction, arrangement of parts, and combination of elements, hereinafter described, and more particularly set forth in the claims.

In the drawings:

Fig. 1 is a plan view illustrating one of the tabulating machine cards employed in the illustrative machine as the item entering controlling means.

Fig. 2 is a representation of a bill or sheet adapted to receive the items and totals, the classification data represented by perforations appearing at the left end of the sheet.

Fig. 3 is a front view of a tabulating machine embodying the present improvements.

Fig. 7 is a view in side elevation of parts of the comparing devices for the bills and tabulating cards, and is taken on the line 7—7 of Fig. 5.

Fig. 8 is a detail view taken on the line 8—8 of Fig. 5.

Fig. 9 is a view in side elevation of the device used to control machine operation upon a change in classification of groups of tabulating cards.

Fig. 10 is a view in side elevation showing some of the parts illustrated in Fig. 7 but in two different operated positions with respect to Fig. 7.

Fig. 11 is a plan view of the analyzing devices associated with the bills.

Fig. 12 is a plan view showing some of the operating connections for the platen.

Fig. 13 is a detail view of the platen detent mechanism.

Fig. 14 is a wiring diagram of the illustrative embodiment.

Figure 4:
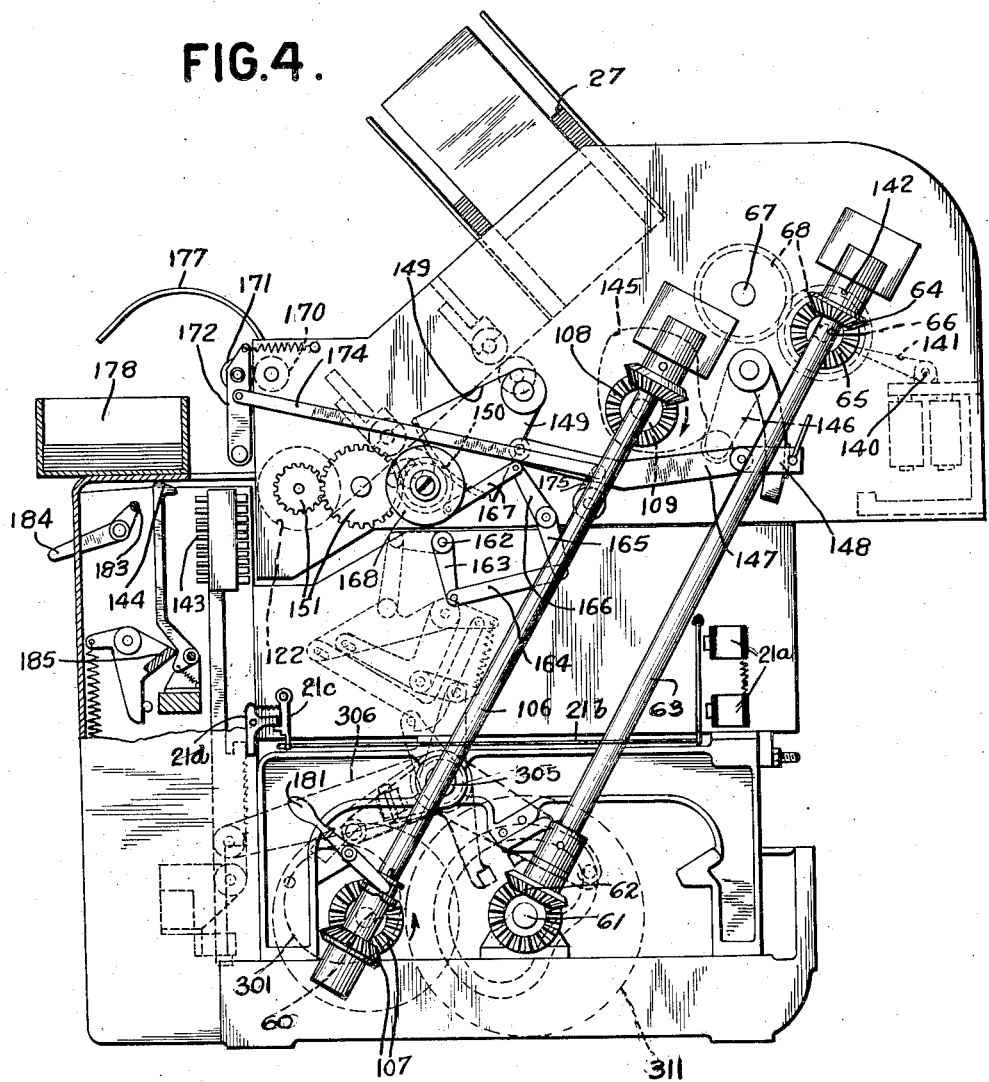
Fig. 4 is a view in side elevation and is taken on the line 4—4 of Fig. 3.

The improvements are shown in connection with the tabulator illustrated in the Lake Patent No. 1,600,413, dated September 21, 1926, to which reference may be had for details of construction of the card feeding, analyzing and total taking devices. Sufficient explanation of these devices will, however, be given to explain their coordination with the present improvements and other features of the illustrative machine.

Referring particularly to Fig. 14, the tabulator referred to includes a set of upper brushes 20 designated as the control brushes and a set of lower or adding brushes 21. The upper brushes analyze the perforations of the record card 22 (Fig. 2). The lower brushes 21 also analyze the perforations in the same field of the record card. The field 24 of perforations of the record card may comprise classification data in order that a disagreement of classification perforations of successive cards at the upper and lower brushes may cause the machine to go into an automatic total taking operation more fully explained in the Lake patent. In the event of continued agreement of successive cards the machine will continue with the item entering operations controlling printing and adding instrumentalities in accordance with the data representing perforations of other fields.

In the present embodiment the machine is adapted to print the items 25 (Fig. 2) and the totals 26 thereof upon a card designated hereinafter as a "bill" 27. The bill 27 also contains classification perforations 28 and a printed number 29 which is a translation of the classification perforations and is provided for the convenience of the operator in discerning discrepancies. A new bill is fed as an incident to each total taking operation at which time the first card of a new group is already at the control brushes 20. Upon the agreement of the classification perforations 24 and 28 the machine will proceed with item entering operations of the new group but any discrepancy between the new bill fed and the first card of a new group will be observed by the operator by stoppage of the machine.

It should also be observed that in the present embodiment the record cards 22 are fed by the card feeding mechanism with the "9" index points leading while in order to get a proper print on the face of the bill, the latter is fed with the "0" perforations leading. The present improvement also provides for the checking of cards and bills when fed to their analyzing brushes in an inverse relation.

The circuit arrangement, in connection with the control brushes, 20 comprises cam controlled contacts 29a intermediate the line side 30 (Fig. 14) and brushes 20, the latter being plugged by wires 31 to control magnets 32 which are permanently connected to the other line side 33 by a wire 34. The plug connections are only shown for one order, it being obvious that as many units are plugged as there are columns analyzed. Upon the passage of the first record card of a new group past the control brushes 20 and which is concomitant with the item entering operation of the last card of the last group, impulses will be transmitted to magnets 32 at differential times.

Each magnet when energized attracts its related armature 35 (Fig. 7) to unlatch a stop member 36 which is then urged by a spring 37 to bring a stop portion 38 in engagement with one of a series of notches 39 formed in the periphery of a spider 40. Three spiders 40 are provided for each column and they are driven frictionally by a shaft 41 which is given a third of a revolution for each card cycle. The notches 39 pass by the stop portions in synchronism with the index points of the record card 22 fed past the control brushes 20.

When a spider 40 is stoppped by an extension 38 the spider will be held back during a portion of the cycle of operation of shaft 41 and then released to permit a supplemental movement. Prior to the end of the cycle the stop member 36 will be relatched to permit the spider to be driven supplementally, this movement occurring during the time the blank portion of the record cards above the "0" index points is being fed past the brushes 20.

During the next cycle of operation, which it will be recalled, is a total taking cycle if cards disagree, the spider will be driven by connections to be later described from the total taking devices. The holding back of the spider caused by the actuation of stop member 36 is equivalent in units to the numerical value represented by the perforation of the record card in the particular column analyzed. For example, if the units index point was "3" the spider would be held back 3 steps of operation.

For the present it may be considered that each spider 40 is provided with a cam portion 42 adapted to engage a foot 43 of a contact operating lever 44 loosely pivoted upon a rod 45 so that the engagement of the elements 42 and 43 will cause the arm 44 to be rocked to close contacts 46. Since the spider 40 has been held back a number of steps which is equal to the numerical value of the index point of the related card column analyzed, the actuation of contacts 46 will accordingly be held up a complementary amount during the total cycle.

Since the particular means utilized to cause the machine to enter into a total taking operation as an incident to change in card groups is different from that shown in the Lake Patent No. 1,600,413 an explanation of this unit will now be given but for a more detailed description of this unit reference may be had to the Carroll Patent No. 1,726,539, dated September 3, 1929.

An impulse caused by the passage of an upper brush 20 through a card perforation causes energization of a magnet 47 the latter being plugged to the related brush by a plug connection 48, the group of magnets 47 having a common connection to the line side 33 by wire 34. By a jumper or plug connection 49, the other magnet 50 of a pair 47—50 (Fig. 9) is serially connected to the related one of the lower brushes, one side of the group of magnets 50 having a common return connection to the line side 30 by a wire 51.

Referring particularly to Fig. 9 each pair of magnets 47—50 is associated with a balanced armature 52 having a wedge-shaped terminal 53 fitting in a similar shaped notch of one arm of a bell crank 54. The armature is held in a neutral position by a spring 55 and is active to keep contacts 56 closed against the normal tension of the upper blade which tends to maintain contacts 56 open. The pairs of contacts 56 are series connected (Fig. 14) in a circuit 57 and the connections therefrom to the rest of the electrical apparatus is similar to the Lake Patent No. 1,600,413 hereinbefore mentioned.

It is sufficient to state that when impulses are transmitted to a pair of magnets 47—50 simultaneously the armature 52 will remain in a neutral position and if this action is the same for all controlling columns, the series of contacts 56 will remain closed and the machine will continue with item entering operations. A dis-simultaneous energization of a pair of magnets 47—50 will, in the manner now to be generally described, but more fully explained in the Carroll patent, cause the related pair of contacts 56 to be opened and since the circuit 57 is now opened a total taking operation will ensue, as fully explained in the Patent No. 1,600,413.

It will be seen that when either magnet 47 or 50 is energized alone bell crank 54 will be rocked clockwise thus shifting the vertical arm of bell crank 54 away from the upper blade which now moves upwardly away from the lower blade to open contacts 56. At the end of the total taking cycle cam 59 will, through suitable connections, depress a bail member 58 pivoted at 58a and which member overlies a series of upper blades of the pairs of contacts 56. Member 58 depresses the upper blade of a pair whereupon spring 55 is now active to shift the lower end of the vertical arm of related bell crank 54 over the upper blade to keep contacts 56 closed as member 58 is shifted upwardly to its normal position.

As an incident to each total taking operation a shaft 60 (Fig. 4) is rotated and through suitable connections a new bill is fed to the bill analyzing brushes. Prior to the explanation of the devices for effecting the above function the means for driving the spiders 40 during the item entering operations will first be described.

In the Hollerith tabulator a shaft 61 (Fig. 4) is rotated during each item entering operation. By a pair of bevel gears 62 a connecting shaft 63 is similarly driven. The upper end of the shaft 63 carries a bevel gear 64 in mesh with a bevel gear 65 (see also Fig. 12) secured to a stub shaft 66. The latter is adapted to drive a shaft 67 by a pair of one-to-one ratio gears 68. Shaft 67 (see Fig. 6) has secured thereto a notched element 69 the notch of which is adapted to be received by the engaging end of a spring urged pawl 70 pivoted to a profile cam 71 (see also Fig. 5). By a connecting sleeve 72 cam 71 is secured to a pinion 73 which is in mesh with a gear 74 secured to the shaft 41. When shaft 67 is driven the notch in disk 69 engaging pawl 70 drives cam 71 and the connected gear 73, the gear ratio being so selected as to provide an angular movement of gear 74 and shaft 41 of 120° for each card cycle. The shaft 41 is adapted to receive the series of spiders 40 which are arranged and mounted on the shaft 41 and urged together by a spring 75 so that they may be frictionally driven by the shaft collectively but each stopped independently at differential times, as before explained.

It is also desirable to be able to know the group number of each card passing the control brushes and to this end each spider has secured to it an irregular shaped cam plate 76 (Fig. 7) in the plane of a feeler finger 77 and which cam plate has the aforementioned cam portion 42. For each order an indicator segment 78 is provided bearing indicia one of which is visible through a sight slot 79 (Fig. 3) to visibly indicate the position of the related indicator segment 78. Each indicator segment is loosely mounted on shaft 45 (Fig. 7) and has a link connection 79 to an integral arm 77a of the feeling finger 77. A series of the latter are pivoted on a shaft 81 dependingly hung from shaft 45 by a pair of arms 80 (see Fig. 5).

Figure 5:
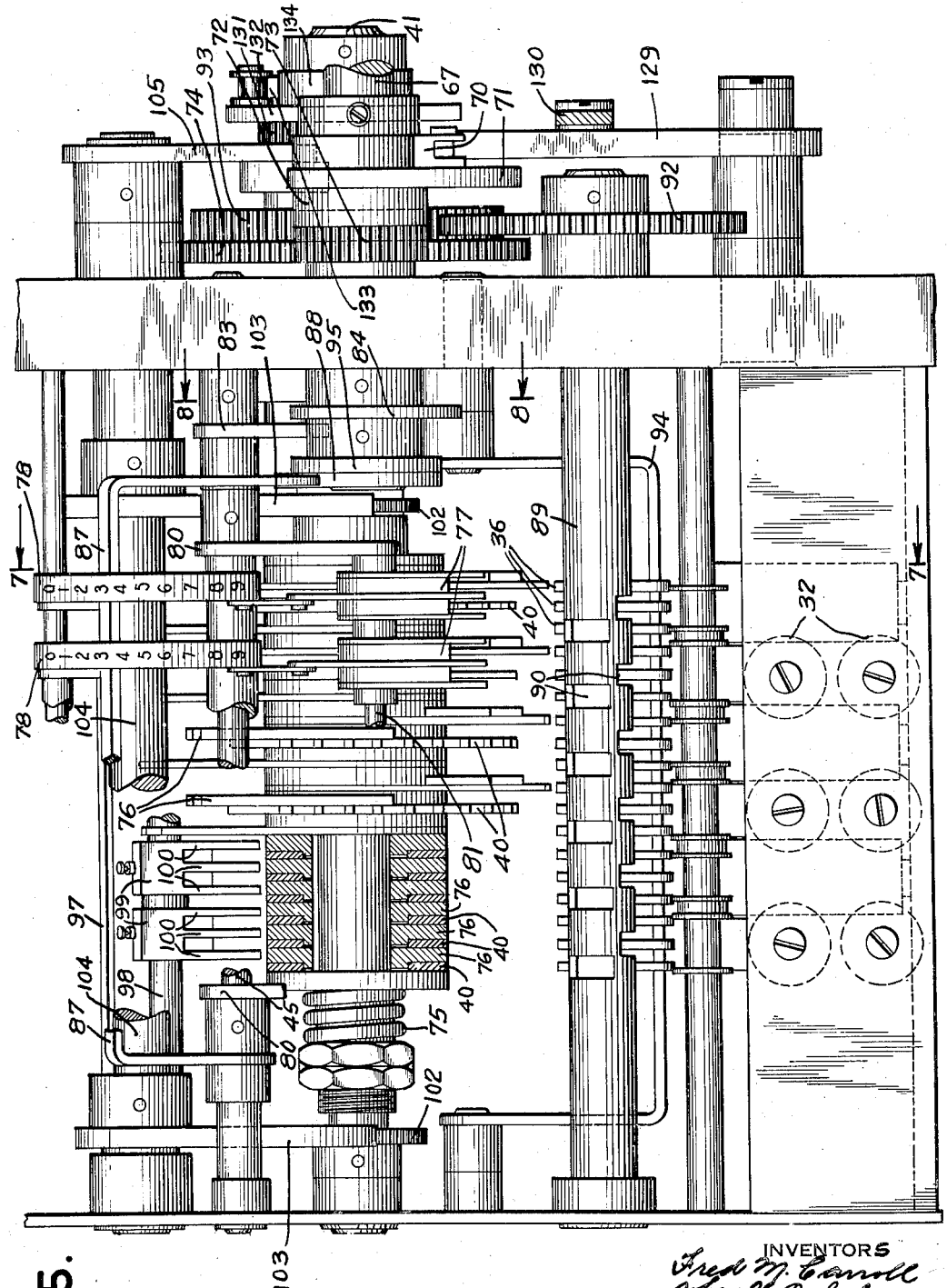
Fig. 5 is a front view of the comparing device shown in Fig. 7.

The arms 80, as shown in Fig. 5, are secured to the shaft 45 and the latter has secured thereto an arm 83 carrying a roller (see Fig. 8) engaging a profile cam 84 driven by shaft 67 in a clockwise direction. As the shaft revolves the cam 84 will rock shaft 45 and by rocking frame 80—81 toward shaft 41 from the Fig. 7 position to the Fig. 10 position, shaft 81 will cause each of the feeler fingers 77 to engage a cam edge 85 of the particular cam 76 in cooperation therewith. As each feeler finger strikes its related cam during a continued movement of frame 80—81 toward the shaft 41 it will be rocked about its pivotal point 81 thus elevating the related indicator segment 78 through the medium of link 79. This position of adjustment will be held by a pawl 82 pivoted on a fixed rod 82a engaging the appropriate one of a series of notches 86. It is understood, of course, that the positioning of the indicator is dependent upon the position the cam element 76 is stopped at the end of the cycle and, in turn, represents the index point analyzed.

In more detail, if cam 76 occupies the full line position shown in Fig. 10 as shaft 81 is shifted to the right from the Fig. 7 position, finger 77 will approach the cam edge 85 of cam 76 and engage the cam before the movement of shaft 81 is stopped. Upon further movement of shaft 81, while finger 77 contacts with cam 76, the finger 77 and its arm 77a will be rocked clockwise to the position shown in Fig. 10, thereby straightening the toggle formed by arm 77a and link 79 thus rocking the indicator segment to the position shown in Fig. 10 so that the numeral "8" is at the reading line.

If the cam 76 occupies the dotted line position shown in Fig. 10, shaft 81 will be near its final position when finger 77 engages the "1" cam part 85 of cam 76 so that finger 77 and its arm 77a is rocked but a slight amount. In this instance indicator segment 78 is shifted but a single step from the Fig. 7 position to bring the numeral "1" to the reading line as shown in Fig. 10.

In general, cam 76 acts as a fulcrum for the finger 77 while shaft 81 is moving thereby measuring the extent of rocking of the finger 77 and its extension 77a and determining the movement of the indicator segment 78.

After the parts have been positioned as shown in Fig. 10 continued rotation of cam 84 in a clockwise direction will permit the frame 80—81 to be restored to the position shown in Fig. 7, the feeler fingers 77 being withdrawn from cooperation with the cam element 76. Since links 80 will be merely rocked about their pivotal connections to the indicating segments, no movement will be imparted to the latter. The indicator segments will remain in their positions of adjustment latched by pawls 82.

The latter are rocked by a bail 87 at the beginning of the next card cycle, the bail being operated by a cam 88 (Fig. 8) secured to drive shaft 67 and when the pawls 82 are rocked sufficiently to withdraw them from engagement with the notches 86 the indicator elements will drop to their lowermost positions, as shown in Fig. 7. The pawls, however, subsequently reengage said notches to hold the indicator segments in their newly adjusted positions. The pawls hold the indicators after a card has been read and since shaft 67 is driven clockwise only during item entering operations the indicator reading is held during the total taking operation.

Since there are three spiders 40 for each column as shown in Fig. 7 in connection with a single column a corresponding number of stop pawls 36 are provided, each pawl 36 being in the plane of the related spider. Since only a single pawl is effective during one cycle it is desirable to lock the other pawls of the set and to this end a hollow tube 89 (Figs. 5, 7 and 10) is provided and for each set of pawls 36 a plurality of slots 90 are provided. When a certain pawl 36 is to be effective its related slot 90 is positioned with respect to the tail 91 of the pawl to allow it to enter (see Fig. 7) when the armature 35 is attracted. At other times the tail 91 of the pawl will ride on the periphery of the tube 89 and is thereby locked against movement.

Tube 89 has secured thereto at its end a gear 92 (Figs. 5 and 6) in mesh with a gear 93 attached to the gear 74 so that rotation of the tube 89 may be effected as an incident to each card cycle and total cycle as well.

Restoration of the operated pawls 36 is effected by a bail 94 which extends transversely to cooperate with the complete set of pawls 36 (Fig. 5) said bail being operated by a cam 95 (Fig. 8) secured to drive shaft 67 and cooperating with an extension 96 of one arm of the bail member 94.

It is, of course, necessary to restore the stopped spider 40 to its proper position in order that it may properly control the contacts 46 in a subsequent operation. Extending transversely of the spiders 40 is a bail 97 (Figs. 5 and 7) in which is journaled a rod 98 carrying pawl members 99, each member 99 having a set of three teeth 100, each of which is in the plane of a shoulder 101 of the related cam 76. Each arm of the bail 97 is provided with teeth 102 in mesh with the teeth of segment racks 103 secured to a rock shaft 104. One end of shaft 104 has secured to it a depending arm 105 (Figs. 5 and 6) carrying a roller in engagement with the cam 71 hereinbefore referred to.

Successive movements of the bail 97 will cause the teeth 100 to engage the stop shoulders 101 of the stopped spiders 40 to positively restore them to their normal starting positions. Each operation, of course, occurs several cycles of operation subsequent to the time a spider 40 is stopped by its related pawl 36.

As premised hereinbefore, upon a change in card group the machine is conditioned for a total taking operation, during which operation a new bill 27 is fed and it is determined whether it corresponds with the first card of the new group. For accomplishing this function the shaft 60 which is driven as an incident to a total taking operation in the tabulator disclosed in the Lake Patent No. 1,600,413 drives a connecting shaft 106 (Fig. 4) by a pair of bevel gears 107. The upper end of shaft 106 carries a bevel gear in mesh with a bevel gear 108 secured to the drive shaft 109.

Shaft 109 has secured thereto a gear 110 (Fig. 6) adapted to drive a gear 111 through an intermediate pinion 112. The pairs of feeding rollers 113 and 114 are intergeared and the lower gear of each set meshes with the larger gear 111 so that a driving connection is established between shaft 109 and the feeding rollers 113 and 114.

Feeding of the bills singly from the supply hopper 115 is effected by a picker 116 of the usual form and is reciprocated by a pair of arms 117 secured to a rock shaft 118, the latter having secured thereto an arm 119 carrying a roller engaging the race of a box cam 120 secured to shaft 109. Each revolution of the cam 120 will cause the picker 116 to feed the lowermost bill to the feeding rollers 114 in order that the bill perforation analyzing brushes 121 may analyze the classification perforations of the bill, (see also Fig. 11). The bill is fed from the brushes 121 to a rotatable platen which is driven concomitantly with the feeding rollers so that the bill is fed around the platen 122 between the periphery thereof and a set of spring urged rollers 123.

Reverting now to the wiring diagram (Fig. 14) it will be observed that brushes 121 are serially connected through cam controlled contacts 124 (see also Fig. 6) to the line side 33 and each brush 121 is serially connected through its related magnet 125 and a pair of contacts 46, hereinbefore mentioned, the latter being connected to the other line side 30 by a wire 126.

By reason of the above connection it will be apparent that if a contact 46 is closed by a spider 40 synchronously with the closure of the circuit at the brush control 121 the related magnet 125 will be energized. It is therefore necessary to close contacts 46 at a point during the succeeding or total taking cycle to determine whether the index point of a column of the first card of a new group coincides with the perforation in a corresponding column of the bill. Due to the inverse relation of feeding the record cards and the bills the contacts 46 are closed at a point in the cycle which is the nines complement of the time in the cycle of the energization of magnet 32, thus making possible a comparison of the bills and record cards.

Figure 6:
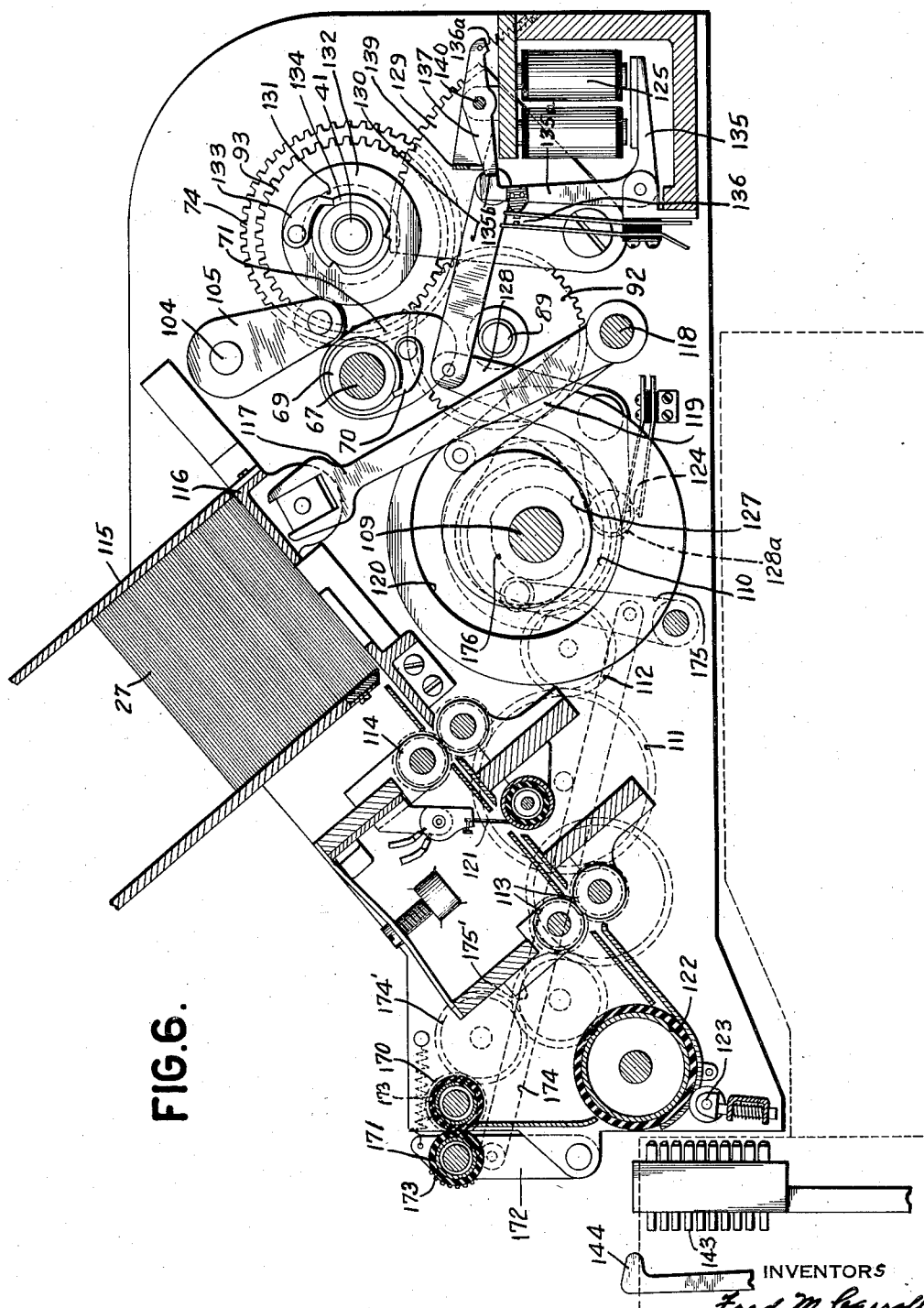
Fig. 6 is a view in side elevation taken on the line 6—6 of Fig. 3 and illustrates the bill feeding devices in detail.

Means are therefore provided for driving the spiders 40 to obtain a closure of contacts 46 during the total taking cycle and referring to Fig. 6 it will be seen that secured to shaft 109 is a cam 127 engaging a roller 128a of a bell crank lever 128 connected to segment 129 by a link 130 to effect a reciprocation of the segment by the cam 127. The segment teeth drive a pinion 131 loose on shaft 41 and secured to the pinion is a disk 132 carrying a pawl 133 in engagement with a notched disk 134 secured to shaft 41. The throw of the segment 129 is such that engagement of the pawl 133 with one of the notches in disk 134 is adapted to effect an angular movement of 240° of shaft 41. It should also be observed that the functions effected by shaft 67, such as release of pawls 82, reciprocation of feeling fingers 77, and operation of bail 94 are not effected during a total taking operation. However, cam 71 is operated during total taking operations to restore the stopped spiders for readiness during the next item entering operation.

If, as before stated, a magnet 125 is energized by reason of a similarity in the card and bill perforations, the armature 135 (Fig. 6) thereof will be attracted to effect closure of contacts 136, each set of contacts being individually latched by pawls 137. As is best shown in Fig. 7 a vertical arm 135a of each armature 135 has provided at its upper end a notch 135b which is normally engaged by the end of the related pawl 137, the resiliency of the right hand contact blade of contacts 136 maintaining this relationship. When a magnet 125 is energized the vertical arm 135a will be shifted to the left as viewed in Fig. 6 to close contacts 136, thereupon the related pawl 137 will be urged by its spring 136a to engage the portion of the arm 135a which is above the notch 135b to thereby hold contacts 136 in closed position. Contacts 136 are series connected and if at the termination of the operation of comparing a bill with a record card, all the contacts 136 are latched closed, a circuit 138 (Fig. 14) will be closed. This circuit is in the automatic starting circuit fully explained in the Lake Patent No. 1,600,413 and when closed permits the machine to go into a tabulating operation in connection with the new group of cards.

In the event that the perforations in a particular card column do not coincide the circuit 138 will be opened and the machine will stop, allowing the operator to visibly compare the bill with the record card to correct the discrepancy. This comparison is readily effected since the operator may read the classification number 29 of the bill (Fig. 2) and compare it with the classification number of the record card as exhibited by the indicators 78 and which is retained during a total taking operation.

Contacts 136 are unlatched during the first tabulating cycle by a bail 139 secured to a shaft 140 (Figs. 4 and 6) to which is secured a lever 141 actuated by a pin 142 (see Fig. 12).

The machine also includes several groups of printing bars 143 (Figs. 3, 4 and 6) adapted to be struck by hammers 144 to effect printing of items 25 (Fig. 2) or the totals 26 thereof upon the bill 27 in the manner fully explained in the Lake Patent No. 1,600,413. The means whereby the printing bars 143 are set under control of the tabulating cards to print items and under control of an accumulator to print the totals is very well known in the art and for this reason is briefly explained herein. For further details reference should be had to the following patents: C. D. Lake 1,600,413, September 21, 1926; C. D. Lake, 1,379,268, May 24, 1921 and G. F. Daly et al., 1,762,145, dated June 10, 1930.

In general when the lower brushes 21 (Fig. 14) locate perforations in the card fields of a tabulating card 22 they cause the energization of printer control magnets 21a which, as shown in Fig. 4 for one magnet, causes the shifting to the right of a call rod 21b and the disabling of a printer control latch 21c. When the latter is disabled it releases a pawl 21d which engages a tooth of the ratchet teeth of the type bar 143, thereby stopping the type bar in its upward movement, after which printing from the hammer 144 takes place.

For raising the type bars in synchronism with the feeding of a tabulating card 22 the type bars are reciprocated by an arm 306 attached to a rock shaft 305. The rocking of shaft 305 for item printing operations is brought about by a listing cam 311, which by means more fully shown and described in the Daly et al. Patent 1,762,145 is adapted to rock shaft 305. The latter shaft is also adapted to be rocked by a total cam 301 secured to the total shaft 60, but as total printing operations form no part of the invention of this application reference should be had to any of the patents herein listed for further details of construction and operation.

Certain other adjuncts related to the printing devices are also employed among which is a feeding device adapted to give a head spacing to the bill to accommodate the usual printed heading and to determine where the first item may be printed. In the present embodiment this comprises a cam 145 (Fig. 4) secured to the total shaft 109 and which rocks a bell crank lever connection 146, one arm of which is connected to a link 147 the latter being adjustably mounted on the arm by a device, such as that illustrated by numeral 148. The link 147 is articulated to a drive segment 149 in mesh with a gear 150b adapted to drive the platen 122 by a train of gears 150, 151 through a pawl and ratchet device 151a (Fig. 12). This driving connection is effective to rotate the platen a predetermined amount to effect the desired initial spacing of the bill.

For the purpose of effectively stopping the rapid rotation of the platen when the desired amount of bill feed has been accomplished the detent device such as that illustrated in Figs. 12 and 13 is preferably employed. In cooperation with a ratchet wheel 152 rotatable with the platen is a detent or pawl 153 impositively held by a spring 154 to engage the interdental spaces of the ratchet wheel. The detent mechanism is normally in the position shown in Fig. 13 and impositively holds the platen during printing time but the pawl is held out of engagement with the ratchet wheel during the time the bill is ejected by mechanism to be described hereinafter and also during the time the platen is rotated for head-spacing the bill. To this end there is secured to shaft 109 a cam 155 having a low portion 156 and high portions 157.

During sheet ejecting and platen rotating time the high portions 157 act upon a rod 158 through bell crank lever 161 and force the pawl 153 downwardly against spring 154 and by means of a camming slot 159 and guide pin 160 the pawl 153 is shifted away from the ratchet wheel 152. At the termination of the above operation the low portion 156 of cam 155 permits the spring 154 to urge the pawl to reengage with the ratchet wheel to prevent overthrow of the platen roller and impositively position the platen. The detent mechanism, however, is effective at a line spacing operation permitting one or more steps of rotation of the roller and held in such position by the interdental spaces of the ratchet wheel. The line-spacing devices for spacing the imprints form no part of the invention and any suitable form may be employed. As herein provided for the Lake machine comprises a rock shaft 162 (Fig. 4) to which is secured an arm 163 connected by a link 164 to a lever 165. A lever 166 secured to the pivotal supporting shaft of lever 165 has a link connection 167 to a pawl carrying disk 168 which through a pawl and ratchet device 169 (Fig. 12) turns gear 150 to rotate the platen to space the items and totals.

Additional mechanism is also provided to eject a printed bill as an incident to each total taking operation and as shown includes a set of rollers 170 (Figs. 4 and 6) and a supplemental set of rollers 171 mounted on a rockable frame 172. The rollers are intergeared by gears 173 to eject a bill between rollers 170 and 171 when the frame 172 is rocked to cause the rollers to grip the bill therebetween. The frame 172 has pivoted thereto a link 174 connected to a lever 175 which is rocked by a box cam 176 (Fig. 6) secured to the shaft 109 and is effective to couple the rollers 170 and 171 together to frictionally feed a bill from the platen after which the bill is guided by a plate 177 (Fig. 4) to fall in a receptacle 178.

The gear 173 rotatable with rollers 170 is driven by a train of gears 174', 175' the latter meshing with the gear secured to the upper feeding roller 113.

In the event that the bill does not properly check with the first record card of a new group the proper one can be inserted in the hopper and the machine run through a regular reset or total cycle. This will cause the improper bill to be ejected and the proper bill fed to the platen. To carry out the above the regular reset key 180 (Fig. 14) is depressed causing the machine to function in the manner described in the Lake Patent No. 1,600,413.

If the bill is in the proper sequence and the record card or cards of a group be in error, the latter may be run out of the machine by the provision of the usual listing or starting key fully shown and described in the Lake Patent No. 1,600,413. Since it is desirable not to have the items or total of such a group printed on the bill, certain other expedients are also employed. To this end there is provided a clutch device 181 (Fig. 4) which disables the connection between bevel gears 107 to prevent the feeding of a bill to the platen at the end of the improper record card or groups of cards.

The printing of items or totals on the bill encircling the platen is prevented by shifting of a rod 183 by a lever 184 which shifts the hammers 144 towards the type to render them ineffective with respect to the operating bail 185. The function and operation of the latter is explained in the Lake Patent No. 1,379,268 to which reference may be had for further details of construction and operation.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is as follows:

1. A machine of the class described comprising, means for representing an item and the classification of the item; means for printing the item under control of the representing means upon a classified record which has a classification designation; and means for comparing the classification designation of the record with the classification of the item to control the printing.

2. A machine of the class described comprising, means for representing an item and the classification of the item; means for printing upon one of a series of classified records which has a classification designation the item under control of the representing means; and means for comparing the classification designation of the record which is to receive the item with the classification of the item for preventing an item printing operation upon a disagreement thereof.

3. A machine of the class described comprising, means for representing a series of items and their classification, means comprising a classified record adapted to provide a record of the series of items to be entered, means for effecting the successive recording operations under control of the representing means, means for comparing the classification of both the items and the record, and means for preventing the recording of any of the items by recording operations upon a disagreement in classification of the items and the record.

4. A machine of the class described comprising, means for representing items of different classifications, means under control of the representing means for printing one of the items upon one of a series of individual records when it has the same classification represented by classification designations thereon, and means dependent upon a change in classification of the items for positioning a successive individual record to receive the next item to be printed dependent upon the agreement of the classifications of the successive record and the item.

5. A machine of the class described comprising, means for representing items of different classification, means for printing upon one of a series of classified records the items represented when the items are of the same classification, means dependent upon a change in classification of the item representing means for positioning a successive record, and means dependent upon an agreement of the classification of the items to be entered and the classification of the record for causing under control of the representing means printing of the items on the positioned record.

6. A machine of the class described comprising, means for representing classified items, means under control of the representing means for printing one or more of said items upon one of a series of records when classifications of the items to be printed and the record are alike, and means for stopping the operation of the machine to prevent the printing of an item of one classification upon one of the records of a different classification.

7. A machine of the class described comprising, a card having designations for designating a classification and other designations for designating an item of an account, means whereby a printing mechanism is set under control of said card to represent said item so that it may be printed upon a record also having classification designations, and means controlled conjointly by the card and record whereby the item of the account on the card is printed by the printing mechanism upon the record only when the classification designations of both agree.

8. In a record controlled machine, a printing mechanism for effecting an imprint upon a classified record, means whereby the printing mechanism is set in accordance with the representations on a classified tabulating card, and means whereby the printing from the printing mechanism is controlled in accordance with the agreement or disagreement of the classifications of the tabulating card and the record.

9. In a machine of the class described, a printing mechanism, means under control of tabulating cards for setting said printing mechanism, means dependent upon change in classification of said cards for positioning a classified record to receive imprints effected by the printing mechanism, means for analyzing and comparing classification characteristics of the first of a series of said tabulating cards with the positioned record, and means controlled by the classification analyzing means for causing the initial operation of the printing mechanism when classifications agree and a continued operation as long as successive tabulating cards agree in classification.

10. In a machine of the class described, a printing mechanism settable under control of a classified tabulating card to print data upon a classified record, means for comparing the classification of the tabulating card with the classification of the record, and means under control of the comparing means whereby the operation of the printing mechanism is prevented upon disagreement of the classifications of both the tabulating card and record but is automatically operated under control of the tabulating card to effect printing if classifications agree.

11. In a tabulating machine, a printing mechanism for effecting a series of item imprints upon a classified record, means for controlling the operation of the printing mechanism by data represented on each of a series of classified tabulating cards, means dependent upon the agreement in classifications of the first tabulating card of the series and the record for causing the automatic operation of the printing mechanism; and means cooperatively associated with a pair of records at a time for analyzing the classification characteristics of the pair of tabulating cards to determine the continued operation of the printing mechanism.

12. In a tabulating machine, a printing mechanism, means for positioning a classified record such as a bill to present a record to the printing line, means for analyzing classification designations of a tabulating card and reading out said designations, means for analyzing the classification designations of a bill concurrently with the reading out of the designations of the tabulating card to compare the designations of the bill and card, and means whereby the setting of the printing mechanism under control of the tabulating card is automatically determined by the result of the comparison.

13. In a tabulating machine, a printing mechanism, a pair of analyzing devices for analyzing classification designations of successive tabulating cards, means for analyzing classification designations of a bill, means controlled conjointly by the bill analyzing means and one of the first named pair of analyzing devices for effecting a comparison of the designations of the bill and one of the tabulating cards to control the operation of the printing mechanism to print upon the bill, and means whereby the other of said pair of analyzing devices controls the setting of the printing mechanism.

14. In a tabulating machine, a printing mechanism, means for analyzing and representing the reading of classification designations of the first of a group of tabulating cards when classification of card groups change, means for subsequently reading out the designations concurrently with the analyzing of designations of a bill and when data related to items is printed upon a preceding bill, and means whereby said printing mechanism is initially set under control of the first of a group of tabulating cards to print upon the bill analyzed if the classifications of the bill and the first of the group of cards agree and continues to be set successively as long as the cards of a group do not change in classification.

15. In a tabulating machine, a printing mechanism adapted to print items upon a classified bill, means for setting up the representation of a classification number of an item, and means whereby the operation of the printing mechanism to print an item on the bill is dependent upon the agreement of the classification designations of the bill with the classification number as represented by said setting means.

16. In a record controlled machine the combination with a printing mechanism to which is presented a bill having classification designations, of classified tabulating cards for determining the data printed on the bill by the printing mechanism, means for feeding the bill so that the first data on the bill is printed at a predetermined line, means for comparing the classification designations of the bill and tabulating card to determine the operation of the printing mechanism and said feeding means, and means for varying the extent of operation of the feeding means.

17. In a record controlled machine, devices for setting up a representation of classification designations of a tabulating card analyzed while in motion, means for analyzing a bill having classification designations, printing mechanism for printing on the bill data designated on the tabulating card, and means for comparing the setting of the devices with the classification designations of the bill.

18. In a record controlled machine, means for analyzing the classification designations of a tabulating card in motion, means for analyzing the classification designations of a bill while in motion, a printing mechanism for printing on the bill data designated on the card, and intermediate mechanism between both analyzing means whereby the operation of the printing mechanism is dependent upon the comparison of the classification designations of the bill and tabulating card.

19. In an automatically controlled tabulating machine controlled by different groups of tabulating cards, means for printing the data of a group of tabulating cards upon a bill, means for automatically continuing the printing operations on a bill as long as the classification of tabulating cards agrees with the classification of a bill, means for automatically presenting a following bill to continue printing operations on the bill under control of a subsequent group of tabulating cards only upon agreement of the classification thereof with the following bill, and means for ejecting and receiving the printed bills.

FRED M. CARROLL.
JOHN H. BAKELAAR.